US012564747B2

(12) United States Patent
Laprade et al.

(10) Patent No.: US 12,564,747 B2
(45) Date of Patent: Mar. 3, 2026

(54) SYSTEMS AND METHODS OF HOLLOW SPRINKLER BUTTONS WITH RIDGES

(71) Applicant: Tyco Fire Products LP, Lansdale, PA (US)

(72) Inventors: Alex Laprade, Lansdale, PA (US); Patrick Luiz, Lansdale, PA (US); Manuel R. Silva, Jr., Cranston, RI (US); Sean E. Cutting, West Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 828 days.

(21) Appl. No.: 17/789,887

(22) PCT Filed: Feb. 17, 2021

(86) PCT No.: PCT/IB2021/051349
§ 371 (c)(1),
(2) Date: Jun. 29, 2022

(87) PCT Pub. No.: WO2021/165854
PCT Pub. Date: Aug. 26, 2021

(65) Prior Publication Data

US 2023/0052069 A1 Feb. 16, 2023

Related U.S. Application Data

(60) Provisional application No. 62/978,044, filed on Feb. 18, 2020.

(51) Int. Cl.
*A62C 37/11* (2006.01)
*A62C 37/12* (2006.01)

(52) U.S. Cl.
CPC .............. *A62C 37/12* (2013.01); *A62C 37/11* (2013.01)

(58) Field of Classification Search
CPC ......... A62C 35/68; A62C 37/11; A62C 37/12; A62C 37/14; A62C 37/16
See application file for complete search history.

(56) References Cited

U.S. PATENT DOCUMENTS 440,704 A * 11/1890 Freeman ................ A62C 37/12 169/39
2,591,872 A * 4/1952 Rider ..................... A62C 37/09 169/42

(Continued)

FOREIGN PATENT DOCUMENTS

CN 202128834 U 2/2012
DE 20202015 U1 8/2002

(Continued)

OTHER PUBLICATIONS

Korean Intellectual Property Office as International Searching Authority; International Search Report and Written Opinion; PCT/IB2021/051349; dated May 7, 2021; 9 pages.

*Primary Examiner* — Darren W Gorman
(74) *Attorney, Agent, or Firm* — Foley & Lardner LLP

(57) ABSTRACT

A sprinkler button includes a body and a wall extending from the body. The body includes a ridge and one or more cavities defined by the ridge and extending into the body. The body defines a hollow chamber on an opposite side of the body from the one or more cavities. The wall includes one or more tabs.

19 Claims, 5 Drawing Sheets

(56) References Cited

U.S. PATENT DOCUMENTS

| | | | | | |
|---|---|---|---|---|---|
| 3,893,513 | A * | 7/1975 | Marsh | A62C 37/12 169/42 |
| 4,228,859 | A * | 10/1980 | Hattori | A62C 37/12 169/57 |
| 4,991,656 | A | 2/1991 | Polan | |
| 5,184,683 | A * | 2/1993 | Takamasa | A62C 37/09 169/37 |
| 7,735,569 | B2 | 6/2010 | Green | |
| 9,265,981 | B2 | 2/2016 | Orr et al. | |
| 2006/0037761 | A1 * | 2/2006 | Shim | A62C 37/09 169/37 |
| 2011/0272168 | A1 * | 11/2011 | Park | A62C 37/12 169/38 |
| 2011/0315407 | A1 * | 12/2011 | Park | A62C 37/12 169/37 |
| 2020/0324155 | A1 * | 10/2020 | Franson | A62C 37/11 |
| 2021/0197002 | A1 * | 7/2021 | Kikuchi | A62C 37/12 |

FOREIGN PATENT DOCUMENTS

| | | | | |
|---|---|---|---|---|
| EP | 0 502 238 | A1 | 9/1992 | |
| JP | S6287654 | U | 4/1987 | |
| JP | 05-007633 | A | 1/1993 | |
| WO | WO-2021077060 | A1 * | 4/2021 | A62C 3/004 |

* cited by examiner

SYSTEMS AND METHODS OF HOLLOW SPRINKLER BUTTONS WITH RIDGES

CROSS-REFERENCE TO RELATED APPLICATIONS

The present application claims the benefit of and priority to U.S. Provisional Application No. 62/978,044, filed Feb. 18, 2020, the disclosure of which is incorporated herein by reference in its entirety.

BACKGROUND

Sprinklers can be used to respond to fires by providing fluids, such as water, to address the fire. For example, sprinklers can deliver fluid from a fluid supply when the sprinkler opens to address the fire.

SUMMARY

At least one aspect relates to a sprinkler button. The sprinkler button includes a body and a wall extending from the body. The body includes a ridge and one or more cavities defined by the ridge and extending into the body. The body defines a hollow chamber on an opposite side of the body from the one or more cavities. The wall includes one or more tabs.

At least one aspect relates to a sprinkler. The sprinkler includes a sprinkler body, a sprinkler button, a thermal trigger, and a frame. The sprinkler body includes an internal passageway that extends from an inlet to an orifice. The sprinkler button includes a button body including a surface defining a ridge and a hollow chamber, and a wall extending from the button body that includes one or more tabs. The thermal trigger applies a load to the sprinkler button. The frame extends from the sprinkler body around the thermal trigger.

At least one aspect relates to a sprinkler button assembly. The sprinkler button assembly includes a body and a wall that extends from the body. The sprinkler button assembly includes an insert that can be received by the body. The body includes a ridge and one or more cavities defined by the ridge and extending into the body. The body defines a hollow chamber on an opposite side of the body from the one or more cavities. The wall extends from the body and includes one or more tabs. The insert is secured by the one or more tabs.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
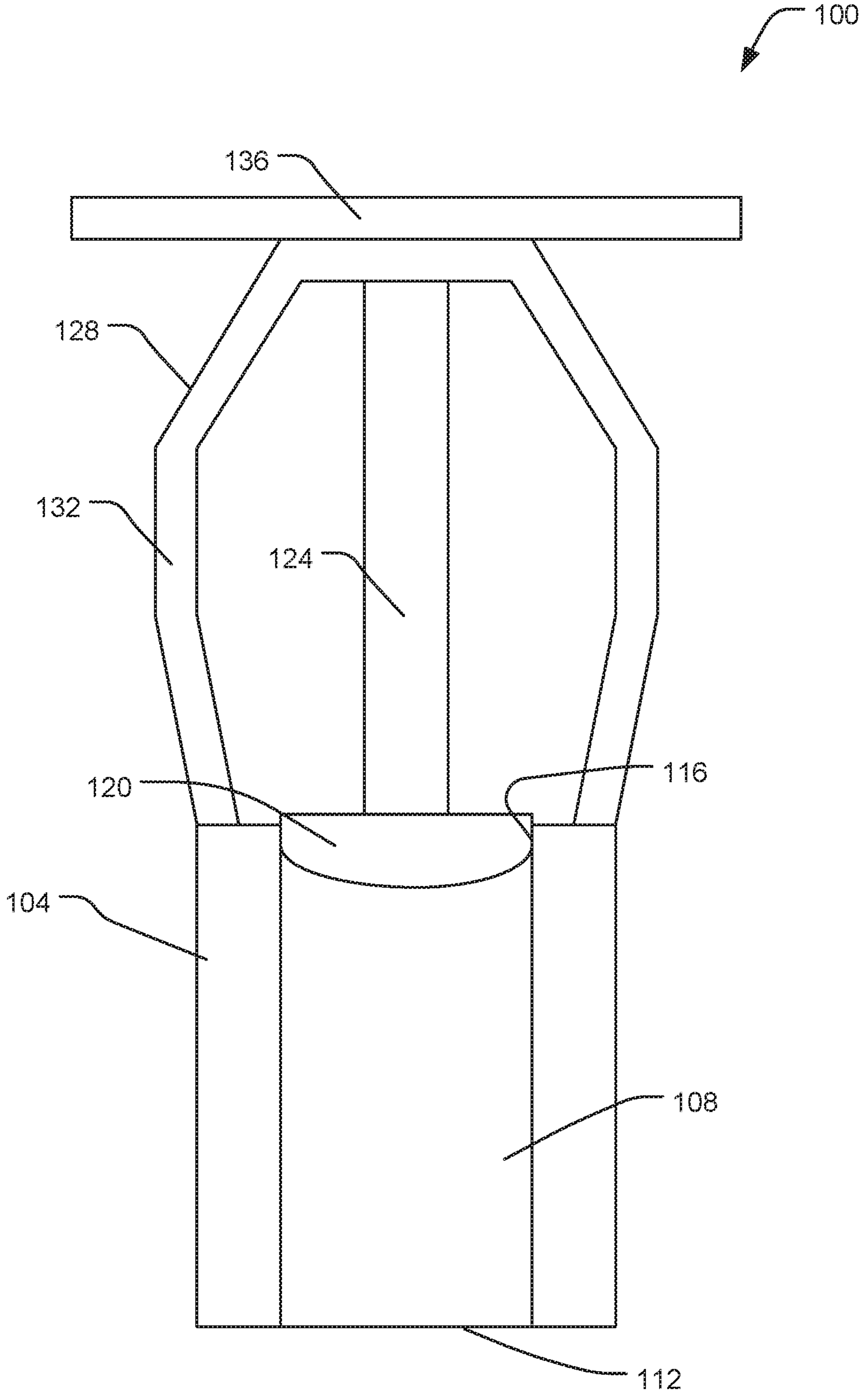
FIG. 1 is a schematic diagram of a sprinkler.

The present disclosure relates generally to the field of fire sprinklers. More particularly, the present disclosure relates to systems and methods of hollow sprinkler buttons with ridges. Fire sprinklers can include a sprinkler button that forms at least part of a seal of the sprinkler to prevent fluid from flowing out of the sprinkler until the sprinkler is actuated responsive to a fire condition. For example, the sprinkler can include a thermal trigger (such as a fusible link that includes two pieces joined together by solder, which melts responsive to increased temperature from a fire, or a glass bulb having a fluid inside that expands responsive to increased temperature from a fire), that breaks responsive to a fire condition. The thermal trigger can be coupled with the sprinkler button to apply a load the sprinkler button that holds the sprinkler button in position to seal the sprinkler. Responsive to the thermal trigger breaking, the sprinkler button can be driven away (e.g., ejected) from the position at which the sprinkler button seals the sprinkler by fluid pressure from fluid in the sprinkler. This allows the sprinkler to output the fluid to address the fire condition, such as to be directed by a sprinkler deflector that outputs the fluid according to a target spray pattern.

Sprinkler buttons may be made from materials such as stainless steel, phosphor bronze, or copper. As such, there may be manufacturing or cost benefits from reducing the amount of material used to manufacture the sprinkler button, such as by making a portion of the sprinkler button hollow. However, reducing the amount of material in the sprinkler button can make the sprinkler button less strong or rigid, and thus susceptible to deformations, leaks, or cracks, particularly under the pressure (from the fluid in the sprinkler) and temperature (from a developing fire) conditions that the sprinkler button operates under. In addition, for the sprinkler button to eject effectively out of the path of the fluid flow, relatively hard materials should contact the frame of the sprinkler as the sprinkler button moves.

Sprinkler buttons in accordance with the present disclosure can include a body and a wall extending from the body. The body includes a ridge and one or more cavities defined by the ridge and extending into the body. The body defines a hollow chamber on an opposite side of the body from the one or more cavities. The wall includes one or more tabs. The ridge can provide structural integrity under pressure and temperature conditions that the sprinkler button can be exposed to, such as to mitigate deformation of the sprinkler button. The one or more tabs can define gaps so that a relatively hard insert secured by the sprinkler button can contact a frame of the sprinkler (e.g., rather than allowing relatively soft material of the sprinkler button to lodge against the frame). The one or more tabs can be angled to more rigidly secure the insert to the sprinkler button to prevent flexing of the insert that may cause leaks.

FIG. 1 depicts a sprinkler 100. The sprinkler 100 includes a body 104 defining an internal passageway 108 that extends from an inlet 112 to an orifice 116. The inlet 112 can be coupled with one or more pipes coupled with a fluid supply to receive fluid from the fluid supply.

The sprinkler 100 can include a sprinkler button 120 that is received in the orifice 116. The sprinkler button 120 can seal the internal passageway 108 to prevent fluid in the internal passageway 108 from being outputted until a fire condition is detected.

The sprinkler 100 can include a thermal trigger 124 that is coupled with the sprinkler button 120 to apply a load to the sprinkler button 120, such as to hold the sprinkler button 120 in a sealing position for sealing the internal passageway 108. The thermal trigger 124 can be triggered (e.g., actuated) responsive to a fire condition, such as a temperature around the thermal trigger 124 meeting or exceeding a rated temperature. For example, the thermal trigger 124 can include a fusible link that includes at least two members coupled with one another by solder. Responsive to the temperature around the thermal trigger 124 meeting or exceeding the rated temperature, the solder can melt, allowing the at least two members to separate from one another, which can reduce or remove the load applied against the sprinkler button 120 to allow the force from the fluid pressure in the internal passageway 108 on the sprinkler button 120 to eject the sprinkler button 120 away from the orifice 116. The thermal trigger 124 can include a glass bulb having fluid that expands to a state sufficient to break the glass bulb responsive to the temperature around the thermal trigger 124 meeting or exceeding the rated temperature, which can reduce or remove the load applied against the sprinkler button 120 to allow the force from the fluid pressure in the internal passageway 108 on the sprinkler button 120 to eject the sprinkler button 120 away from the orifice 116.

The sprinkler 100 can include a frame 128 coupled with a deflector 136. The frame 128 can include one or more frame arms 132 that extend from the body 104 towards the deflector 136 and around the thermal trigger 124. The sprinkler button 120, when ejected, can strike the frame 128 in a manner so that the sprinkler button 120 moves away from the sprinkler 100 to allow fluid to flow out of the orifice 116 to the deflector 136 without being obstructed by the sprinkler button 120. The deflector 136 can cause the fluid to be outputted from the sprinkler 100 according to a target spray pattern (e.g., based on the structure of one or more tines of the deflector 136).

Figure 2:
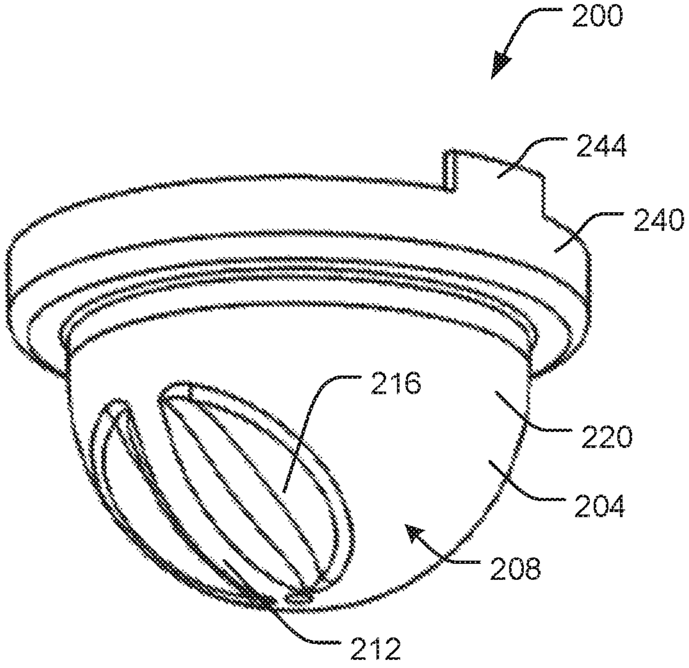
FIG. 2 is a perspective view of a sprinkler button body.
Figure 3:
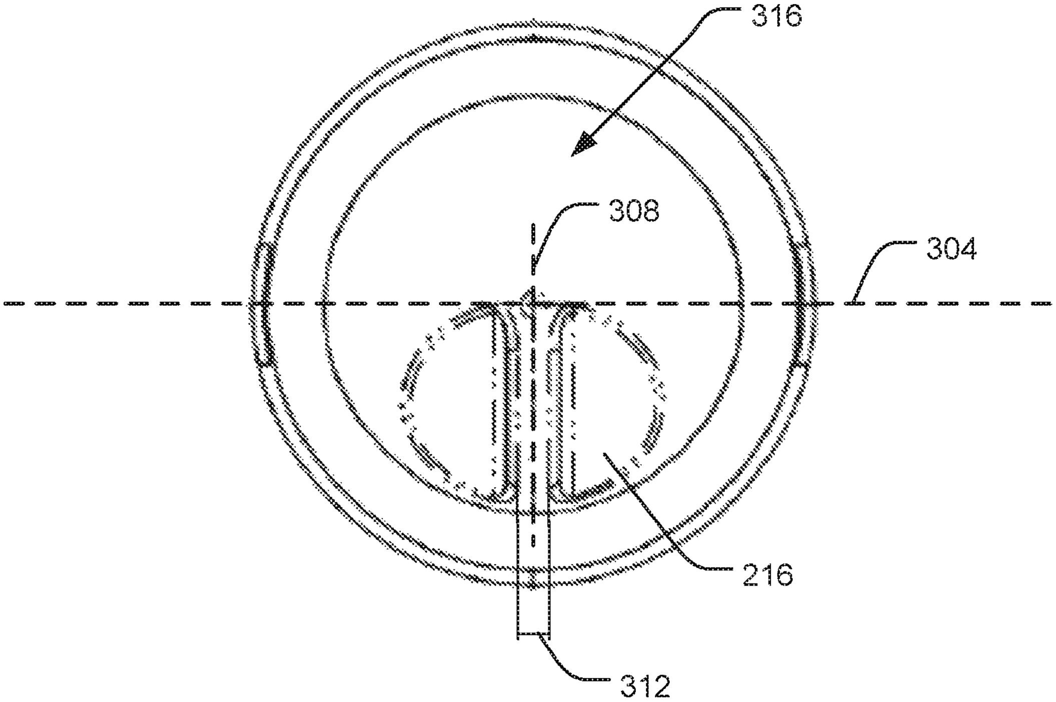
FIG. 3 is a top view of a sprinkler button body.
Figure 4:
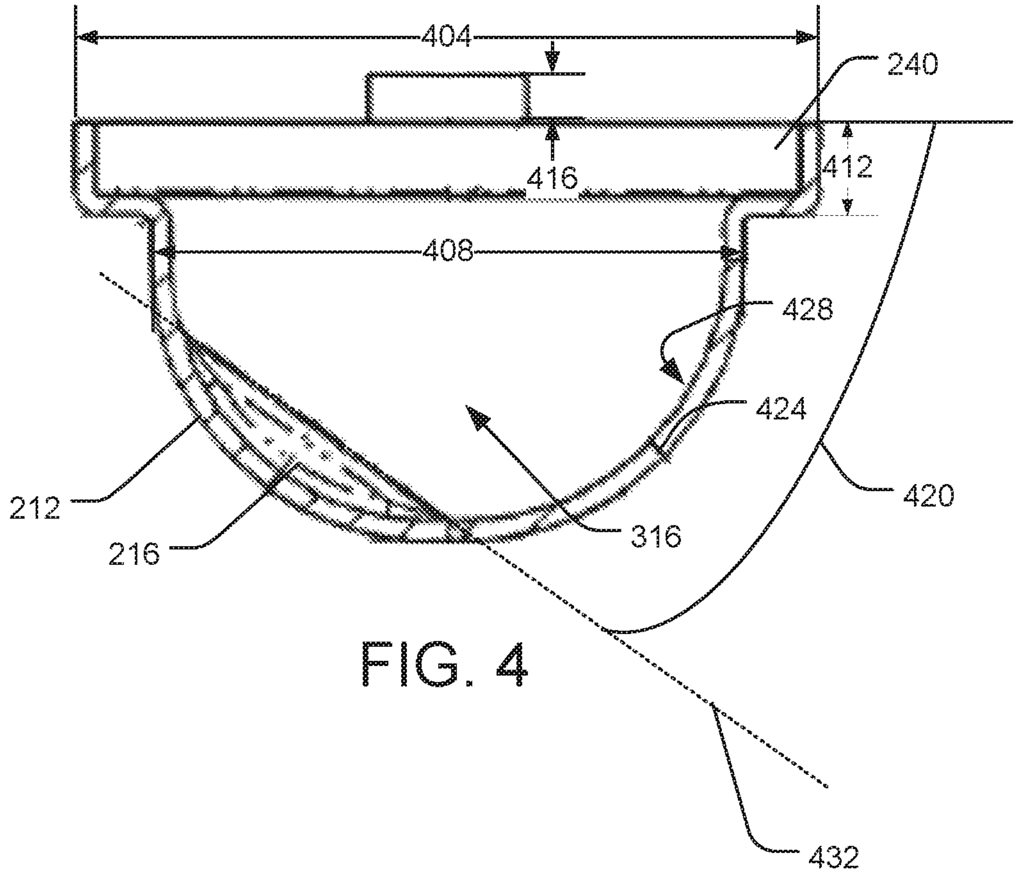
FIG. 4 is a section view of a sprinkler button body.

FIGS. 2-4 depict a sprinkler button 200. The sprinkler button 200 can be used to implement the sprinkler button 120 described with reference to FIG. 1. The sprinkler button 200 includes a button body 204 and a wall 240 (e.g., tab wall) that extends from the button body 204. The button body 204 can be received in the orifice 116 such that the button body 204 faces fluid in the internal passageway 108. The button body 204 can be at least partially hollow, such as by forming a shell. The button body 204 can be made of material such as copper, stainless steel, phosphor bronze, nickel, titanium, chromium, or an alloy of one or more such materials. The button body 204 can be made of a corrosion resistant material. For example, the button body 204 may be made of a nickel and copper alloy (e.g., MONEL) or a nickel and chromium alloy (e.g., INCONEL).

The button body 204 can be spherical. The button body 204 can include a surface 208 that is spherical. For example, radii from a center of the button body 204 to any point on at least a portion of the surface 208 can be constant (or can be within a threshold of constant, such as within five percent, three percent, or one percent of the same value). The button body 204 can define a hollow chamber 316, allowing for reduced materials to be used to form the button body 204.

The button body 204 can include a ridge 212 that defines at least one cavity 216 extending into the button body 204 from the surface 208. For example, the surface 208 can define two cavities 216 as depicted in FIGS. 2-4. The ridge 212 can be spherical, such that the ridge 212 has a curvature that is equal to or within a threshold of the curvature of the surface 208 (e.g., radii from the center of the button body 204 to any point on the ridge 212 are within five percent, three percent, or one percent of radii to other spherical portions of the surface 208).

The ridge 212 can provide rigidity to the sprinkler button 200, such as to reduce the likelihood of the sprinkler button 200 deforming. For example, the ridge 212 can mitigate deformation, such as where the sprinkler button 200 is made of a relatively soft metal, such as copper. The ridge 212 can alleviate stress and avoid the cavities 216 from caving into chamber 316 responsive to pressure from fluid applied against the surface 208. The ridge 212 can define a ridge width 312. The ridge width 312 can be sized so that the ridge 212 provides sufficient rigidity to the sprinkler button 200 while allowing for cavities 216 for reducing the amount of material of the sprinkler button 200 and allowing the sprinkler button 200 to be effectively ejected. The ridge width 312 can be greater than 0.05 inches and less than 0.2 inches. The ridge width 312 can be greater than 0.8 inches and less than 0.12 inches. The ridge width can be 0.9 inches. The ridge 212 may include one or more radiused features by which the ridge 212 curves down from the ridge width 312 to the cavities 216.

As depicted in FIGS. 2-4, the at least one cavity 216 can be defined by a portion 220 of the surface 208 that extends at most to an equator 304 of the button body 204 that divides the surface 208 along a direction perpendicular to a longitudinal axis 308 of the ridge 212. As such, the surface 208 can asymmetrically define the at least one cavity 216 to be on one half of the surface 208, which can facilitate ejecting the sprinkler button 200 away from the frame 128 of the sprinkler 100.

The tab wall 240 can include one or more tabs 244. The tab wall 240 and the button body 204 can be monolithic, and the tab wall 240 can be made of the same material as the button body 204. The tab wall 240 can extend at least partially around a circumference of the button body 204. The tabs 244 can extend away from the button body 204 (e.g., extend perpendicular to a plane perpendicular to where each end of the equator 304 meets the tab wall 240). The tab wall 240 can receive and couple with an insert (e.g., insert 750 of FIG. 7). The tab wall 240 can rigidly secure the insert.

The tab wall 240 can be wider than the button body 204, which can allow the sprinkler button 200 to be effectively ejected while properly sealing the orifice 116 and reducing material used to form the button body 204. For example, as depicted in FIG. 4, the tab wall 240 can have a wall diameter 404 greater than a body diameter 408 of the button body 204. A ratio of the wall diameter 404 to the body diameter 408 can be greater than 1:1 and less than 2:1. The ratio can be greater than 1:1 and less than 1.5:1. The ratio can be greater than 1.1 and less than 1.25:1. The wall diameter 404 can be greater than 0.5 inches and less than 1.5 inches. The wall diameter 404 can be greater than 0.75 inches and less than 1.25 inches. The wall diameter 404 can be greater than 0.9 inches and less than 1.1 inches. The wall diameter 404 can be 0.93 inches. The body diameter 408 can be greater than 0.3 inches and less than 1.5 inches. The body diameter 408 can be greater than 0.5 inches and less than 1.2 inches. The body diameter 408 can be greater than 0.7 inches and less than 0.8 inches. The body diameter 408 can be 0.74 inches.

The tab wall 240 can define a wall height 412, and the one or more tabs 244 can define a tab height 416 that the one or more tabs 244 extend beyond the wall height 412. The sizing of the wall height 412 and tab height 416 can facilitate securely receiving the insert. The wall height 412 can be greater than the tab height 416, equal to the tab height 416, or less than the tab height 416. For example, a ratio of the wall height 412 to the tab height 416 can be greater than 1:3 and less than 3:1. The ratio can be greater than 1:2 and less than 2:1. The ratio can be greater than 1:1.5 and less than 1.5:1. The ratio can be greater than 1:1.25 and less than 1.25:1. The ratio can be 1:1. The wall height 412 can be greater than 0.03 inches and less than 0.24 inches. The wall height 412 can be greater than 0.04 inches and less than 0.20 inches. The wall height 412 can be greater than 0.06 inches and less than 0.18 inches. The wall height can be greater than 0.09 inches and less than 0.15 inches. The wall height can be 0.12 inches. The tab height 416 can be greater than 0.02 inches and less than 0.18 inches. The tab height 416 can be greater than 0.03 inches and less than 0.15 inches. The tab height 416 can be greater than 0.04 inches and less than 0.12 inches. The tab height 416 can be greater than 0.05 inches and less than 0.09 inches. The tab height 416 can be 0.06 inches.

The at least one cavity 216 can define an angle 420 from the tab wall 240 (e.g., from an edge of the tab wall 240 from which the one or more tabs 244 extend) to a tangent 432 of the at least one cavity 216. The angle 420 can correspond to an amount of material not present to provide the cavity 216, such as to facilitate proper ejection of the sprinkler button 200. The angle 420 can be greater than 20 degrees and less than 50 degrees. The angle 420 can be greater than 30 degrees and less than 40 degrees. The angle 420 can be 35 degrees.

The button body 204 can have a wall thickness 424 from the surface 208 to an inner surface 428 of the button body 204 that defines the chamber 316. Due to features that facilitate the structural integrity of the button body 204, such as the ridge 212, the wall thickness 424 can be made relatively to allow for the chamber 316 to be formed (e.g., enable the button body 204 to be hollow). The tab wall 240 may also have a thickness equal to the wall thickness 424 (e.g., such that the sprinkler button 200 has a constant wall thickness all around, or a thickness within a threshold tolerance of constant all the way around). The wall thickness 424 can be greater than 0.01 inches and less than 0.05 inches. The wall thickness 424 can be greater than 0.02 inches and less than 0.035 inches. The wall thickness 424 can be 0.025 inches.

Figure 5:
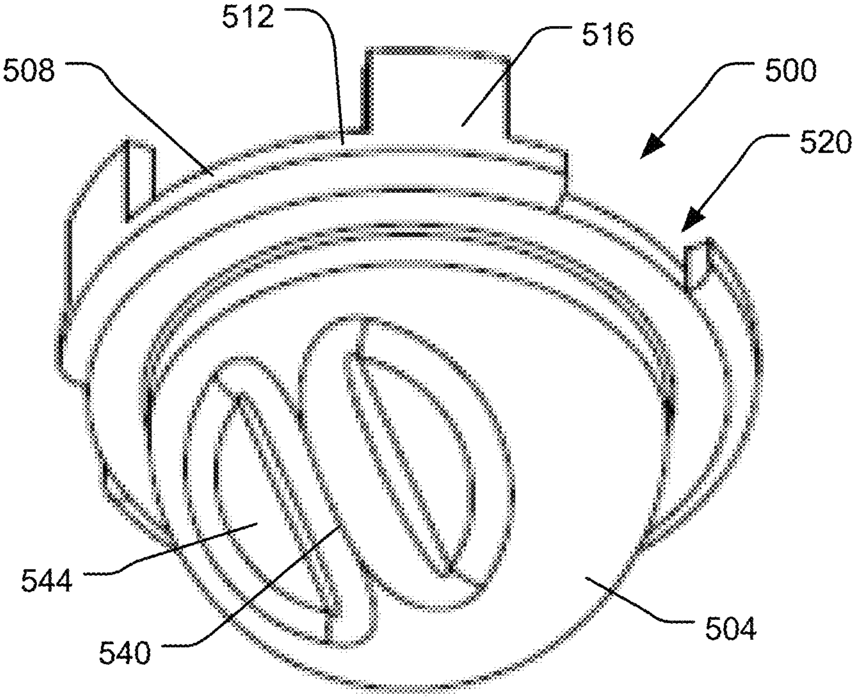
FIG. 5 is a perspective view of a sprinkler button body including a tab wall with gaps.
Figure 6:
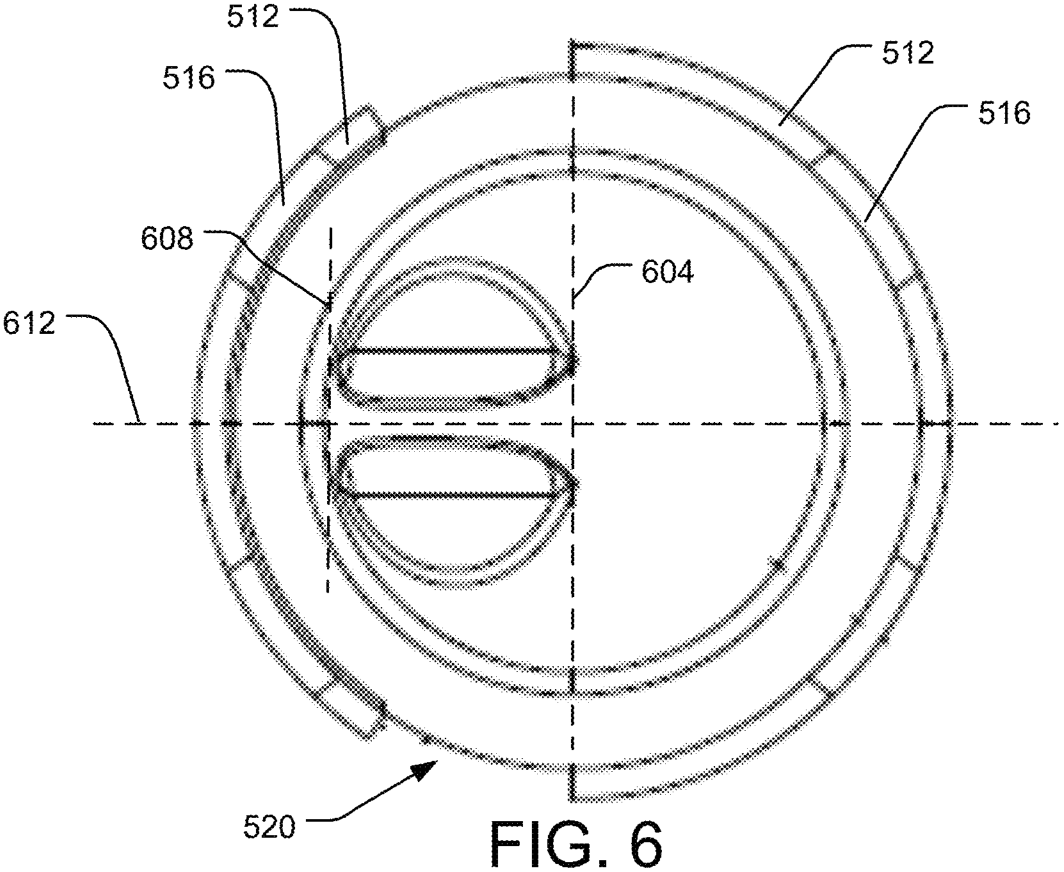
FIG. 6 is a top view of a sprinkler button body including a tab wall with gaps.

FIGS. 5 and 6 depict a sprinkler button 500. The sprinkler button 500 can incorporate features of the sprinkler button 200 described with reference to FIGS. 2-4. For example, the sprinkler button 500 may include ridge 540 and cavities 544, which may be similar to the ridge 212 and cavities 216 of the sprinkler button 200.

The sprinkler button 500 includes a button body 504 and at least one tab wall 508 that extends from the button body 504. The at least one tab wall 508 can include a first wall portion 512 that extends around a portion of the button body 504. The first wall portion 512 can be outward from the button body 504. One or more tabs 516 can extend further from the first wall portion 512 in a direction away from the button body 504.

The at least one tab wall 508 can define one or more gaps 520 between first wall portions 512 (e.g., between adjacent first wall portions 512). The gaps 520 can facilitate proper ejection of the sprinkler button 500 by exposing at least a portion of an insert received by the at least one tab wall 508. For example, in some situations, the sprinkler button 500 may be made of a relatively soft material (e.g., copper), which may lodge in the frame arms of the sprinkler (e.g., frame arms 132 of frame 128 depicted in FIG. 1) when the sprinkler button 500 is ejected. The gaps 520 can allow for a relatively harder material of the insert to contact the frame 128 rather than the relatively softer portions of the sprinkler button 500, which can result in a more elastic collision between the sprinkler button 500 and frame 128 to more easily eject the sprinkler button 500 out of the frame 128.

The at least one tab wall 508 can define the one or more gaps 520 on a same side of the sprinkler button 500 as the ridge 540 and cavities 544. For example, as depicted in FIG. 6, the gaps 520 can extend up to (e.g., not beyond) an equator 604 of the button body 504. The gaps 520 may extend along an arc length less than to a tangent 608 to a longitudinal axis 612 of the ridge 540.

Figure 7:
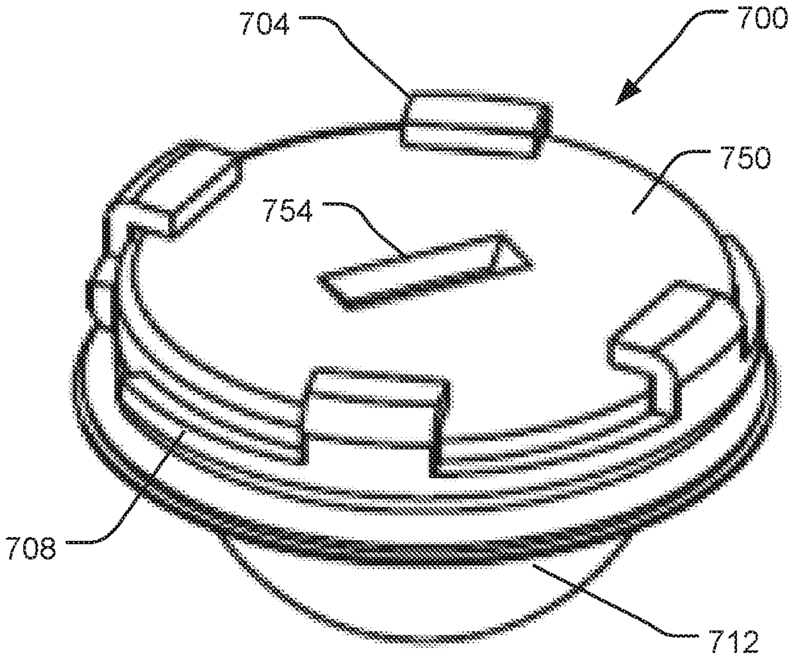
FIG. 7 is a perspective view of a sprinkler button assembly that includes a sprinkler button and an insert.
Figure 8:
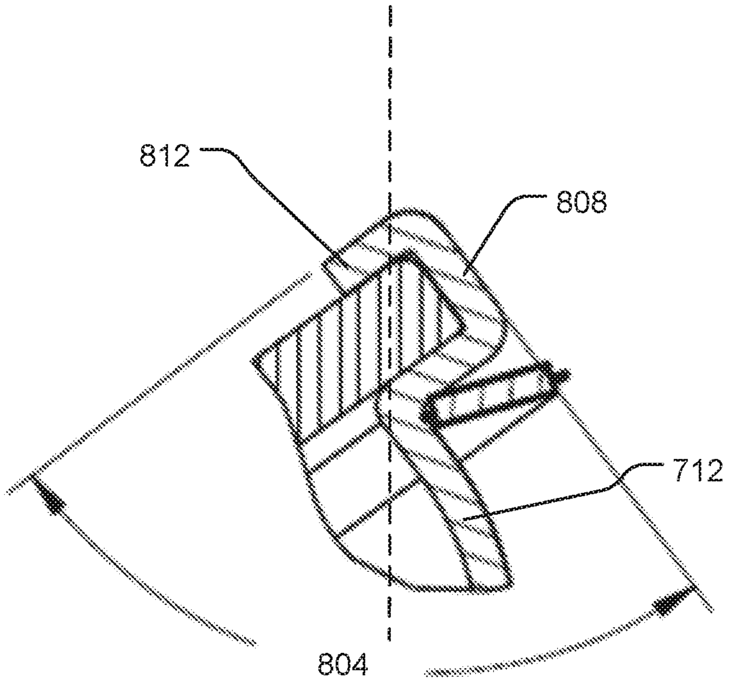
FIG. 8 is a partial section view of a sprinkler button assembly that includes a sprinkler button and an insert.

FIGS. 7 and 8 depict a sprinkler button 700 and an insert 750. The sprinkler button 700 can incorporate features of the sprinkler button 200 described with reference to FIGS. 2-4 or the sprinkler button 500 described with reference to FIGS. 5 and 6. The sprinkler button 700 can receive the insert 750 and rigidly secure the insert 750. The insert 750 can be made of a relatively hard material, such as a harder material than the sprinkler button 700, such as stainless steel. The insert 750 can include a receiver 754 to receive a thermal trigger (e.g., receive at least a portion of thermal trigger 124 described with reference to FIG. 1).

In some situations, the insert 750 may flex during repetitive pressurization of the sprinkler button 700. This can cause the sprinkler button 700 to move, which may result in leak paths to form (e.g., for fluid to be outputted from the orifice 116 even if a fire condition is not present). The sprinkler button 700 can include tabs 704 of a tab wall 708 that reduce the likelihood of flexing of the insert 750, such as by enabling the sprinkler button 700 and insert 750 to move together.

For example, the tabs 704 can be shaped to press into the insert 750. As depicted in FIG. 8, the tabs 704 can define an angle 804 between a first tab wall portion 808 that extends away from button body 712 and a second tab wall portion 812 that extends over the insert 750 to secure the insert 750. The angle 804 can be less than ninety degrees, which can enable the tabs 704 to be pressed into the insert 750. The angle 804 can be greater than eighty degrees and less than ninety degrees. The angle 804 can be greater than eighty degrees and less than ninety degrees. The angle 804 can be greater than eighty five degrees and less than ninety degrees. The angle 804 can be greater than eighty seven degrees and less than ninety degrees. The angle can be eighty eight degrees.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel, or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A sprinkler button, comprising:

a body comprising a ridge and a surface that asymmetrically defines a plurality of cavities to be on one half of the surface and extending into the body, the body defining a hollow chamber on an opposite side of the body from the plurality of cavities; and a wall extending from the body, the wall includes one or more tabs.

2. The sprinkler button of claim 1, comprising:

the surface is spherical.

3. The sprinkler button of claim 1, comprising:

the body is made of copper, stainless steel, or phosphor bronze.

4. The sprinkler button of claim 1, comprising:

the body and the wall are monolithic.

5. The sprinkler button of claim 1, comprising:

the body comprises a spherical shell having a thickness greater than 0.02 inches and less than 0.035 inches.

6. The sprinkler button of claim 1, comprising:

a ratio of a height of the wall to a height by which the one or more tabs extend beyond the wall is greater than 1:2 and less than 2:1.

7. The sprinkler button of claim 1, comprising:

an angle of the one or more plurality of cavities relative to the wall is greater than 30 degrees and less than 40 degrees.

8. The sprinkler button of claim 1, comprising:
the wall includes a plurality of wall portions that define at least one gap between adjacent wall portions of the plurality of wall portions.

9. The sprinkler button of claim 1, comprising:
the one or more tabs form an angle by which the one or more tabs extend around an insert that is less than ninety degrees.

10. A sprinkler, comprising:
a sprinkler body comprising an internal passageway that extends from an inlet to an orifice;
a sprinkler button, comprising:
a button body comprising a surface defining a ridge and asymmetrically defining a plurality of cavities to be on one half of the surface and extending into the button body, the button body defining a hollow chamber on an opposite side of the body from the plurality of cavities; and
a wall extending from the button body, the wall comprises one or more tabs;
a thermal trigger that applies a load to the sprinkler button; and
a frame that extends from the sprinkler body around the thermal trigger.

11. The sprinkler of claim 10, comprising:
the thermal trigger is triggered responsive to a fire condition to remove the load from the sprinkler button so that pressure from fluid in the internal passageway ejects the sprinkler button.

12. The sprinkler of claim 10, comprising:
the surface defines the plurality of cavities adjacent to the ridge.

13. The sprinkler of claim 10, comprising:
the button body is made of at least one of copper, stainless steel, phosphor bronze, nickel, titanium, and chromium.

14. The sprinkler of claim 10, comprising:
the button body comprises a spherical shell having a thickness greater than 0.02 inches and less than 0.035 inches.

15. The sprinkler of claim 10, comprising:
a ratio of a height of the wall to a height by which the one or more tabs extend beyond the wall is greater than 1:2 and less than 2:1.

16. The sprinkler of claim 10, comprising:
the wall includes a plurality of wall portions that define at least one gap between adjacent wall portions of the plurality of wall portions; and
the one or more tabs form an angle by which the one or more tabs extend around and receive an insert, the angle is less than ninety degrees.

17. The sprinkler of claim 10, comprising:
a deflector that receives fluid from the internal passageway responsive to actuation of the thermal trigger and outputs the fluid with a target spray pattern.

18. A sprinkler button assembly, comprising:
a body comprising a ridge and a surface that asymmetrically defines a plurality of cavities to be on one half of the surface defined by the ridge and extending into the body, the body defining a hollow chamber on an opposite side of the body from the plurality of cavities;
a wall extending from the body, the wall includes one or more tabs; and
an insert secured by the one or more tabs.

19. The sprinkler button of claim 1, comprising:
an angle from the wall to a tangent of the plurality of cavities is greater than or equal to 20 degrees and less than or equal to 50 degrees.

* * * * *